United States Patent [19]

Di R Francesco et al.

[11] Patent Number: 5,314,674

[45] Date of Patent: May 24, 1994

[54] PROCESS FOR THE SYNTHESIS OF A ZEOLITE OF MTT TYPE, PRODUCTS OBTAINED AND THEIR APPLICATION IN ADSORPTION AND CATALYSTS

[75] Inventors: Di Renzo Di R Francesco; Fajula Fran ois, both of Montplellier; Des Courieres Thierry, Lyons; Anglerot Didier, Lons, all of France

[73] Assignee: Societe Nationale Elf Aquitaine, Courbevoie, France

[21] Appl. No.: 973,767

[22] Filed: Nov. 9, 1992

[30] Foreign Application Priority Data

Nov. 8, 1991 [FR] France .................................. 91 13816

[51] Int. Cl.$^5$ ............................................. C01B 33/26
[52] U.S. Cl. .................... 423/328.2; 423/700; 502/64
[58] Field of Search ................ 502/64, 77; 423/328.2, 423/700

[56] References Cited

U.S. PATENT DOCUMENTS

| | | | |
|---|---|---|---|
| 5,030,432 | 7/1991 | Occelli | 502/61 |
| 5,063,038 | 11/1991 | Kirker et al. | 502/77 |
| 5,160,500 | 11/1992 | Chu et al. | 423/785 |
| 5,192,727 | 3/1993 | Nair et al. | 502/64 |

*Primary Examiner*—Anthony McFarlane
*Attorney, Agent, or Firm*—Burgess, Ryan & Wayne

[57] ABSTRACT

Process for the synthesis of a zeolite of MTT type in the absence of any nitrogenous organic agent, from a reaction mixture containing water, a source of tetravalent silicon and ethanol and optionally a source of trivalent aluminium and a source of hydroxide ions. The products obtained after heating the zeolite in air to 70°–120° C. or washing with water at 60°–90° C. are useful as selective organophilic adsorbents or as catalysts for the conversion of hydrocarbons.

25 Claims, No Drawings

PROCESS FOR THE SYNTHESIS OF A ZEOLITE OF MTT TYPE, PRODUCTS OBTAINED AND THEIR APPLICATION IN ADSORPTION AND CATALYSTS

BACKGROUND OF THE INVENTION

1) Field of the Invention

This invention relates to a process for the synthesis of a zeolite of the MTT type, the zeolite obtained and its use as catalyst and as selective organophilic adsorbent.

2) Background Art

The structure of zeolite MTT was established in 1985 by Rohrman and co-workers (Zeolites, 5, 352, 1985) and Wright and co-workers (J.C.S. Chem. Commun. 1117, 1985). It is a zeolite of orthorhombic symmetry (a=2.15 nm, b=1.11 nm and c=0.50 nm) which has $0.52 \times 0.45$ nm channels parallel to the c axis bounded by rings containing ten tetrahedra. In the other two crystallographic directions the zeolite exhibits a very dense lattice of rings containing six tetrahedra. These structural characteristics endow zeolites of MTT type with a unidirectional porosity and an excellent stability of the supporting structure.

Zeolites whose structure corresponds to the MTT type which are known so far are ZSM-23, EU-13, ISI-4 and KZ-1 (Meier and Olson, Atlas of Zeolite Structure Types, Butterworth, 1987). They are solids of interest for the catalytic conversion of hydrocarbons and of organic compounds and for adsorption.

The synthesis of zeolites of MTT type is described in a number of patents summarised in Table I. It is also described in the scientific literature by Parker and Bibby (Zeolites, 3, 8, 1983), Ernst et al. (Catal. Today, 3, 1, 1988) and Zones (Zeolites, 9, 458, 1989).

TABLE I

| Patent No. | Applicant Company | Priority year | Zeolite obtained | Structurant |
|---|---|---|---|---|
| FR 2313980 | Mobil | 1975 | ZSM 23 | pyrrolidine |
| EP 108486-B | ICI | 1982 | EU 13 | ammonium or phosphonium |
| EP 125078-B | Mobil | 1983 | ZSM 23 | heptane-1,7-bis-trimethyl-ammonium |
| EP 178846-A | Mobil | 1983 | ZSM 23 | heptane-1,7-bis-trimethyl-ammonium |
| EP 220893-A | Mobil | 1985 | ZSM 23 | pyrrolidine |
| GB 2190910-B | BP | 1986 | ZSM 23 | diisopropanolamine |
| GB 2202838-B | ICI | 1986 | ZSM 23 | octane-1,8-bis-trimethyl-ammonium |
| EP 102497-B | Res. Asso. Petrol. | 1982 | ISI 4 | ethylene glycol or monoethanolamine |

The zeolites of MTT type are prepared by hydrothermal crystallisation of reactive alkali metal aluminosilicate gels. The syntheses are performed in the presence of a nitrogenous organic agent such as pyrrolidine, tertiary and quaternary alkylammoniums or diisopropanolamine. In Patent EP 102,497-B the organic agent employed is monoethanolamine or ethylene glycol.

At the end of the synthesis the organic agent is present trapped in the porosity of the zeolite and its removal, which is necessary to free the micropore volume of the zeolite, is performed by an oxidizing calcination at a temperature which is generally higher than 500° C. This calcination stage presents a number of disadvantages because, in addition to its energy cost, it can entail a degradation of the crystalline structure and is accompanied by a release of nitrogen oxides which it is indispensable to treat for environmental reasons. In addition, the cost of the syntheses is augmented because the organic agent is generally the most costly component of the reaction mixture.

A process for the synthesis of a zeolite of MTT type which does not use any nitrogenous organic agent has now been found.

SUMMARY OF THE INVENTION

The precursor of the zeolite can be converted into zeolite without calcination by a moderate heat treatment. This treatment does not entail any degradation of the crystalline structure. The zeolite obtained exhibits a remarkable thermal and chemical stability.

The process for the synthesis of a zeolite of the MTT type according to the invention is characterised in that a reaction mixture is produced containing water, a source of tetravalent silicon and ethanol and optionally a source of trivalent aluminium and a source of hydroxide ions, this mixture is maintained at a temperature above 80° C. and at a pressure at least equal to the autogenous pressure for a sufficient period to perform the crystallization of the reaction mixture as a precursor of zeolite, and the precursor is then converted into zeolite by removal of the ethanol and of the water of hydration of the cations.

DESCRIPTION OF THE PREFERRED EMBODIMENTS

Without wishing to be restricted by this explanation, we think that it is the use of an adequate quantity of ethanol to modify the solubility of the silica in the reaction mixture that makes the synthesis possible by supplying a degree of supersaturation which is particularly propitious to this structure.

In Table 2 we specify the molar ratios of reactants permitting the crystallization of a zeolite of the MTT type.

TABLE 2

| | Broad range | Preferred range | Particularly preferred range |
|---|---|---|---|
| $Al^{III}/SiO_2$ | 0–0.1 | 0–0.08 | 0–0.05 |
| $Na^+/SiO_2$ | 0–4 | 0.01–2 | 0.03–1 |
| $EtOH/SiO_2$ | 2–200 | 2–100 | 4–30 |
| $OH^-/SiO_2$ | 0–2 | 0.01–1 | 0.03–0.5 |
| $H_2O/SiO_2$ | 5–200 | 5–150 | 5–50 |

Among the sources of tetravalent silicon which can be employed in the preparation of the reaction mixture there may be mentioned finely divided solid silicas in the form of hydrogel, of aerogels or of colloidal suspensions, water-soluble silicates such as alkali metal silicates like sodium silicate, hydrolysable silicic esters such as tetraalkyl orthosilicates of formula $Si(OR)_4$, in which R denotes a $C_1$–$C_4$ alkyl such as methyl and ethyl.

The source of silicon is used in the form of a true aqueous solution in the case of water-soluble silicates or else of an aqueous suspension which may be colloidal, in the case of finely divided silicates.

The traces of aluminium which are present in the source of silicon do not interfere with the crystallization. Moreover, the aluminium can be deliberately incorporated in the synthesis in the form of aluminium salts such as sulphate, nitrate, chloride, fluoride, acetate, aluminium oxides and hydroxides, aluminates and especially alkali metal aluminates such as sodium aluminate, aluminium esters such as aluminium trialkoxides of formula $Al(OR)_3$ in which R denotes a $C_1$-$C_4$ alkyl radical such as methyl, ethyl or propyl.

The source of hydroxide ions is chosen from strong inorganic bases, especially hydroxides of the alkali metals of group IA of the Periodic Classification of the elements and hydroxides of alkaline-earth metals and strong organic bases, especially quaternary ammonium hydroxides, preference being given to the strong inorganic bases, especially to sodium hydroxide, NaOH.

The mixing of the ingredients constituting the reaction mixture may be carried out in any order.

Advantageously, an alkaline solution is prepared first of all by dissolving the strong base in water. The strong base is generally sodium hydroxide in pellet form. The ethanol is then added to this alkaline solution followed by the source of silicon. These two operations are generally carried out at room temperature.

The whole is transferred to an autoclave provided with an agitation system. The mixture is heated under autogenous pressure until the zeolite has completely crystallized. The reaction time is generally between 15 and 150 hours. The temperatures varies between 80° and 200° C.

The synthesis period can be shortened by adding crystallization nuclei to the reaction mixture. The nuclei are obtained by grinding a zeolite of MTT type. In the absence of nuclei it is also advantageous to subject all or part of the reaction mixture to aging at a temperature which is lower than the crystallization temperature.

Some of the properties of the final solid, such as the size and the form of the crystals, can be affected by these modifications, but the crystal structure and the adsorption characteristics remain unaltered.

The crystals obtained are the precursor of the zeolite consisting of the zeolite trapping the water of hydration of the cations and the ethanol in its pores and cavities. These crystals are isolated from the reaction mixture by filtration and are washed with distilled or deionized water until weakly basic washings are obtained.

The washed crystals are next dried at a temperature of between 50° and 90° C., preferably at about 70° C.

The stoichiometric composition of the precursor of the zeolite, expressed in moles of oxides is the following.

$$a\ M_{2/n}O.\ b\ Al_2O_3.\ SiO_2.\ c\ H_2O.\ d\ EtOH$$

where
M is an alkali metal of group IA of the Periodic Classification of the elements, or an alkaline-earth metal or a quaternary ammonium, preferably sodium:
a ranges from 0 to 0.1
b ranges from 0 to 0.1
c ranges from 0 to 1
d ranges from 0 to 1.

The X-ray diffraction pattern of the precursor of the zeolite MTT is described in Table 3.

The X-ray diffraction pattern was obtained by a traditional method employing copper K alpha radiation and an amplifier detector. The recording of the signal intensities is performed as a function of their position expressed in two theta, where theta is the Bragg angle. These data give the relative intensities and the lattice distances, d(nm) in nanometres, which are characteristic of the crystal structure. The values may vary slightly as a function of the size of the crystals and of their degree of hydration, but as a general rule the X-ray diffraction pattern constitutes a characteristic of the structure in question.

TABLE 3

| X-Ray diffraction pattern of the precursor of zeolite MTT | |
|---|---|
| $d(10^{-1}\ nm)$ | I/I max |
| 11.19 | 0.9 |
| 10.93 | 0.9 |
| 10.16 | 0.1 |
| 7.83 | 0.2 |
| 5.60 | 0.1 |
| 5.43 | 0.1 |
| 4.50 | 0.5 |
| 4.41 | 0.4 |
| 4.27 | 0.3 |
| 3.88 | 0.3 |
| 3.69 | 1.0 |
| 3.61 | 0.8 |
| 3.54 | 0.3 |
| 3.43 | 0.4 |
| 3.33 | 0.1 |
| 2.84 | 0.1 |
| 2.52 | 0.4 |
| 2.44 | 0.1 |
| 2.38 | 0.1 |

The zeolite is obtained from the precursor by freeing its cavities and channels.

In the case of zeolites of MTT type synthesized according to the methods of the prior art the cavities and channels contain nitrogenous organic bases or possibly ethylene glycol. The porosity can be freed only by calcination, by thermally degrading the structurant molecules.

The porosity of the MTT zeolite prepared according to the invention is freed by treatments at moderate temperature, sufficient to cause the departure of the molecules of water and ethanol. The porosity of the zeolite is freed by drying with air at 70°–120° C. or by washing with water at 60°–90° C.

The zeolite thus obtained retains its crystallinity and its adsorption capacities after prolonged thermal and hydrothermal treatment or after acidic treatment. Before use it can be subjected to a treatment aimed at removing the traces of sodium which may be present.

The zeolites obtained according to the invention are suitable as organophilic adsorbents which permit the separation of organic molecules from water.

In their protonated form or after exchange with cations they can be employed as catalysts or catalyst components for the catalytic conversion reactions of hydrocarbon compounds.

The following examples illustrate the invention without, however, limiting it.

EXAMPLE 1

0.7 grams of sodium hydroxide (NaOH, Prolabo Normapur) in pellet form are dissolved in a 500-ml stainless steel autoclave containing 30 ml of deionized water and 216 grams of ethanol (SDS PPA) are added. 50 grams of silica sol containing 40% by weight of silica (Ludox AS-40, du Pont de Nemours) are then added with strong stirring. Taking into account the presence of traces (0.02% by weight) of aluminium in the source of silica, the stoichiometry of the crystallisation gel is the following:

$$0.08\ Na_2O,\ 0.0005\ Al_2O_3,\ SiO_2,\ 9.4\ H_2O,\ 13.5\ EtOH$$

Stirring is continued for one hour thirty minutes and the autoclave is then closed and the temperature is raised to 140° C., stirring being continued at 300 rev/min (revolutions per minute). After 48 hours the zeolite crystals are recovered by filtration and are washed with water and dried in the oven at 70° C. in air for 12 hours.

The solid exhibits an X-ray diffraction pattern corresponding to that of Table 2. The total quantity of water and of ethanol which is trapped in the pores after drying at 70° C. is 3% by weight, as measured by thermogravimetry.

Expressed in moles of oxides, the composition of the zeolite is the following:

0.05 Na$_2$O, 0.002 Al$_2$O$_3$, SiO$_2$, 0.02 EtOH, 0.1 H$_2$O

The weight of zeolite, dried at 70° C., collected in this synthesis is 18.36 grams, which corresponds to an 85% yield based on the silica used.

Thermogravimetric analysis of the zeolite shows that all of the water and ethanol occluded in the pores is removed after heating to 120° C.

Volumetric analysis by nitrogen adsorption at 77K results in a specific surface of 206 m$^2$/g and an accessible micropore volume of 0.08 ml/g.

This zeolite adsorbs 0.8% by weight of water (5 torr, 25° C.), 5% by weight of n-hexane (15 torr, 25° C.) and 0.3% by weight of cyclohexane (15 torr, 25° C.). These data illustrate the selectivity of the zeolites according to the invention for apolar organic molecules of small kinetic diameter.

EXAMPLE 2

This example illustrates the thermal and chemical stability of the zeolites of MTT type according to the invention.

A synthesis of zeolite according to the invention was carried out in a two-liter reactor by reproducing the operating conditions and the stoichiometry of the preceding example and by multiplying the various quantities used by three.

The solid obtained (49.5 g of dry product) exhibits an X-ray diffraction pattern characteristic of a zeolite of MTT type. Its specific surface is 230 m$^2$/g and its adsorption capacity for n-hexane is 5.3% by weight.

Ten grams of this sample are treated at reflux for 2 hours in a 6-normal solution of hydrochloric acid. At the end of the treatment the zeolite has retained its crystallinity (measured by X-ray diffraction), its specific area is 215 m$^2$/g, its adsorption capacity for n-hexane is 5.5% by weight and that for water 0.5%. The acidic treatment has therefore further improved the selectivity of the zeolite for the adsorption of the hydrocarbon.

Another portion of the preceding preparation was calcined under a stream of air (100 ml/min) for 10 hours at 900° C. This sample has remained crystalline; its specific surface is 200 m$^2$/g and its adsorption capacity is 4.8% by weight of n-hexane and 0.5% by weight of water.

EXAMPLES 3-5

Examples in which the operating conditions and the stoichiometry of the crystallisation gels were modified for the preparation of zeolites of MTT type according to the invention. In Examples 3 and 4 the source of silicon employed is a microporous solid silica. In Example 5 the aluminium content in the crystallization gel was increased by adding sodium aluminate.

| Ex. | Al/SiO$_2$ | EtOH/SiO$_2$ | Na/SiO$_2$ | H$_2$O/SiO$_2$ | T(°C.) | t(h) |
|---|---|---|---|---|---|---|
| 3 | 0.022 | 8.3 | 0.57 | 17 | 160 | 48 |
| 4 | 0.022 | 6.1 | 0.08 | 9 | 150 | 44 |
| 5 | 0.045 | 8.8 | 0.6 | 19 | 160 | 46 |

In the above three syntheses the zeolites obtained exhibit the X-ray diffraction pattern characteristic of the structure of MTT type.

We claim:

1. Process for the synthesis of a zeolite of an MTT structure which comprises forming a nitrogen template-free reaction mixture of water, a source of tetravalent silicon and ethanol, maintaining this mixture at a temperature above 80° C. and at a pressure at least equal to the autogenous pressure for a sufficient period for the crystallization of the reaction mixture as a precursor of zeolite to occur and converting the precursor into zeolite by removal of the ethanol and of the water of hydration of cation.

2. Process according to claim 1, wherein the reaction mixture contains a source of trivalent aluminium.

3. Process according to claim 1, wherein the reaction mixture contains a source of hydroxide ions.

4. Process according to claim 1, wherein the molar ratio of the reactants in the reaction mixture is such that Al$^{III}$:SiO$_2$=0 to 0.1, Na$^+$:SiO$_2$=0.005 to 4, EtOH:SiO$_2$=2 to 200, OH$^-$:SiO$_2$=0 to 2, H$_2$O:SiO$_2$=5 to 200.

5. Process according to claim 4, wherein the molar ratio of the reactants in the reaction mixture is such that Al$^{III}$:SiO$_2$=0 to 0.08, Na$^+$:SiO$_2$=0.01 to 2, EtOH:SiO$_2$=2 to 100, OH$^-$:SiO$_2$=0.01 to 1, H$_2$O:SiO$_2$=5 to 150.

6. Process according to claim 5, wherein the molar ratio of the reactants in the reaction mixture is such that Al$^{III}$:SiO$_2$=0 to 0.05, Na$^+$:SiO$_2$=0.03 to 1, EtOH:SiO$_2$=4 to 30, OH$^-$:SiO$_2$=0.03 to 0.5, H$_2$O:SiO$_2$=5 to 50.

7. Process according to claim 1, wherein the source of tetravalent silicon is chosen from the group consisting of finely divided solid silicas in the form of hydrogel, of aerogels or of colloidal suspensions, water-soluble silicates and hydrolysable silicic esters.

8. Process according to claim 2, wherein the source of trivalent aluminium is selected from the group consisting of aluminium salts aluminum oxides, aluminum hydroxides.

9. Process according to claim 3, wherein the source of hydroxide ions is selected from the group consisting of inorganic bases and organic bases.

10. Process according to claim 3 wherein the source of hydroxide ions is an inorganic base.

11. Process according to claim 1 wherein ethanol, a source of silicon (IV) and optionally a source of aluminium (III) are added to an alkaline solution prepared by dissolving a base in water and then heating the reaction mixture for a period of time under autogenous pressure until complete crystallization of zeolite occurs.

12. Process according to claim 11, wherein the reaction mixture is heated to a temperature of between 80° and 200° C.

13. Process according to claim 11 wherein the reaction mixture is heated for between 15 and 150 hours.

14. Precursor of zeolites of an MTT structure, wherein its composition, expressed in moles of oxides, corresponds to $$a\ M_{2/n}O.\ b\ Al_2O_3.\ SiO_2.\ c\ H_2O.\ d\ EtOH$$

where
- n = 1 or 2
- M is chosen from the group consisting of the alkali metals of group IA of the Periodic Classification of elements, the alkaline-earth metals and quaternary ammoniums and
- a ranges from 0 to 0.1
- b ranges from 0 to 0.1
- c ranges from 0 to 1
- d ranges from 0 to 1 and in that its X-ray diffraction pattern is described in Table 3.

15. Process according to claim 7 wherein the water-soluble silicates are alkali metal silicates.

16. Process according to claim 7 wherein the water-soluble silicate is sodium silicate.

17. Process according to claim 7 wherein the hydrolysable silicic esters are tetralkyl orthosilicates of formula $Si(OR)_4$ in which R denotes a $C_1$-$C_4$ alkyl.

18. Process according to claim 8 wherein the aluminium salts are selected from the group consisting of sulphate, nitrate, chloride, fluoride, and acetate.

19. Process according to claim 8 wherein the aluminum salts are alkali metal aluminates.

20. Process according to claim 19 wherein the alkali metal aluminate is sodium aluminate.

21. Process according to claim 8 wherein the aluminium salts are aluminium trialkoxides of formula $Al(OR)_3$ in which R denotes a $C_1$-$C_4$ alkyl radical.

22. Process according to claim 9 wherein the inorganic base is an hydroxide of the alkali metals of group IA of the Periodic Classification of the Elements, and the organic bases is quaternary ammonium hydroxide.

23. Process according to claim 10 wherein the inorganic base is sodium hydroxide.

24. A method for the production of a zeolite of an MTT structure which is useful as an organophilic adsorbent or a catalyst for the catalytic conversion of hydrocarbons, which comprises drying a precursor of a zeolite having an MTT structure of a composition having a formula expressed in moles of oxide, corresponding to $$(a)\ M_{2/n}O\ (b)\ Al_2O_3.\ SiO_2.\ (c)\ H_2O\ (d)\ EtHO$$

where
- M is chosen from the group consisting of the alkali metals of group IA of the Periodic Classification of elements, the alkaline-earth metals and quaternary ammoniums and
- a ranges from 0 to 0.1
- b ranges from 0 to 0.1
- c ranges from 0 to 1
- d ranges from 0 to 1 with air at 70°-120° C. or by washing said precursor with water at 60°-90° C.

25. Process according to claim 3 wherein the source of hydroxide ions is a hydroxide of the alkali metal of Group IA of the Periodic Classification of the elements and a hydroxide of an alkaline-earth metal.

* * * * *